US007257774B2

(12) United States Patent
Denoue et al.

(10) Patent No.: US 7,257,774 B2
(45) Date of Patent: Aug. 14, 2007

(54) SYSTEMS AND METHODS FOR FILTERING AND/OR VIEWING COLLABORATIVE INDEXES OF RECORDED MEDIA

(75) Inventors: Laurent Denoue, Palo Alto, CA (US); Tohru Fuse, Santa Clara, CA (US); Patrick Chiu, Menlo Park, CA (US); Lynn D. Wilcox, Palo Alto, CA (US); David W. McDonald, Seattle, WA (US)

(73) Assignee: Fuji Xerox Co., Ltd., Tokyo (JP)

( * ) Notice: Subject to any disclaimer, the term of this patent is extended or adjusted under 35 U.S.C. 154(b) by 665 days.

(21) Appl. No.: 10/207,108

(22) Filed: Jul. 30, 2002

(65) Prior Publication Data
US 2004/0021685 A1    Feb. 5, 2004

(51) Int. Cl.
    *G06F 3/00* (2006.01)
(52) U.S. Cl. .................. 715/719; 715/721; 715/733; 715/751; 715/764; 715/501.1
(58) Field of Classification Search .............. 715/719, 715/721, 733, 764, 864, 866, 501.1, 512, 715/530, 531, 751
See application file for complete search history.

(56) References Cited

U.S. PATENT DOCUMENTS

| | | | |
|---|---|---|---|
| 5,600,775 A * | 2/1997 | King et al. ............. | 715/500 |
| 5,889,523 A | 3/1999 | Wilcox et al. | |
| 6,105,055 A * | 8/2000 | Pizano et al. ............. | 709/204 |
| 6,243,708 B1 * | 6/2001 | deVries et al. ............. | 707/102 |
| 6,279,014 B1 * | 8/2001 | Schilit et al. ............. | 715/512 |
| 6,327,590 B1 * | 12/2001 | Chidlovskii et al. .......... | 707/5 |
| 6,334,127 B1 * | 12/2001 | Bieganski et al. ........... | 707/5 |
| 6,573,907 B1 * | 6/2003 | Madrane ................. | 715/719 |
| 6,631,184 B1 * | 10/2003 | Weiner ................. | 379/92.01 |
| 6,956,593 B1 * | 10/2005 | Gupta et al. ............. | 715/751 |

(Continued)

FOREIGN PATENT DOCUMENTS

EP          0751471 A1 *   1/1997

(Continued)

OTHER PUBLICATIONS

He et al. in "Auto-Summarization of Audio-Video Presentations," *Proceedings of ACM MultiMedia '99*, 1999.

(Continued)

*Primary Examiner*—Lucila X. Bautista
(74) *Attorney, Agent, or Firm*—Sughrue Mion, PLLC; Joseph Bach

(57) ABSTRACT

Systems and methods for filtering and viewing collaborative indexes of annotations of multimedia or video streams can include obtaining a multimedia or video stream, obtaining user indexes of annotations of the multimedia or video stream, merging the indexes, associating portions of the multimedia or video stream with the annotations, determining high-value annotations and displaying the high value annotations. Systems and methods for providing useful visualizations of the indexes of annotations and high value annotations are also provided.

36 Claims, 9 Drawing Sheets

U.S. PATENT DOCUMENTS

| | | | |
|---|---|---|---|
| 6,973,665 B2 * | 12/2005 | Dudkiewicz et al. | 725/46 |
| 7,035,807 B1 * | 4/2006 | Brittain et al. | 704/278 |
| 7,051,275 B2 * | 5/2006 | Gupta et al. | 715/512 |
| 2002/0049787 A1 * | 4/2002 | Keely et al. | 707/512 |
| 2002/0097983 A1 * | 7/2002 | Wallace et al. | |
| 2002/0107842 A1 * | 8/2002 | Biebesheimer et al. | 707/3 |
| 2002/0120925 A1 * | 8/2002 | Logan | |
| 2002/0161804 A1 * | 10/2002 | Chiu et al. | |
| 2003/0070139 A1 * | 4/2003 | Marshall et al. | 715/512 |
| 2003/0189588 A1 * | 10/2003 | Girgensohn et al. | 345/723 |
| 2005/0160113 A1 * | 7/2005 | Sipusic et al. | 707/104.1 |
| 2005/0234958 A1 * | 10/2005 | Supusic et al. | |
| 2006/0061595 A1 * | 3/2006 | Goede et al. | 345/619 |

FOREIGN PATENT DOCUMENTS

| | | | |
|---|---|---|---|
| EP | 1065607 A2 * | 1/2001 | |
| WO | WO 01/61601 A1 * | 8/2001 | |

OTHER PUBLICATIONS

Li et al., "Browsing Digital Video," *Proceedings of CHI 2000*, 2000.

Correia et al., "Active Video Watching Using Annotation," *ACM Multimedia '99*, 1999.

Resnick et al., "An Open Architecture for Collaborative Filtering of Netnews," *Proceedings of CSCW'94*, 1994.

Goldberg et al., "Using Collaborative Filtering to Weave an Information Tapestry," *CACM*, 35(12), pp. 51-60, Dec. 1992.

Belabanovic et al., "Content-Based, Collaborative Recommendation," *CACM*, 40(3), pp. 66-72, 1997.

Hill et al., "Recommending and Evaluating Choices in a Virtual Community of Use," *Proceedings of CHI '95*, 1995.

U.S. Appl. No. 09/951,733, filed Sep. 2001, Marshall et al.

* cited by examiner

|  | GROUP 1 | GROUP 2 | GROUP 3 |
|---|---|---|---|
| USER 1 | 1 | 0 | 1 |
| USER 2 | 0 | 1 | 0 |
| USER 3 | 1 | 1 | 0 |
| USER 4 | 0 | 1 | 0 |

|  | USER 1 | USER 2 | USER 3 | USER 4 |
|---|---|---|---|---|
| USER 1 | 3/3 | 0/3 | 2/3 | 1/3 |
| USER 2 |  | 3/3 | 2/3 | 2/3 |
| USER 3 |  |  | 3/3 | 2/3 |
| USER 4 |  |  |  | 3/3 |

SYSTEMS AND METHODS FOR FILTERING AND/OR VIEWING COLLABORATIVE INDEXES OF RECORDED MEDIA

BACKGROUND OF THE INVENTION

1. Field of Invention

This invention is directed to systems and methods for filtering and viewing collaborative indexes of annotations of one or more multimedia or video streams.

2. Description of Related Art

Digital multimedia recordings of meetings, seminars, and classes are becoming more widely available. Systems and methods for taking notes with respect to various sorts of multimedia recordings using laptops, pen-based notebook computers, personal digital assistants and the like, have been developed. The NOTELOOK and LITEMINUTES products, by Fuji Xerox Co., Ltd., are examples of such systems and methods. Further, various ways of annotating interesting points in a meeting or other video stream have been devised using anything from the devices described above to key tags or wireless telephones. These annotations are generally time stamped and/or associated with video streams for browsing through the video streams and/or retrieving specific portions of the video streams.

Using the above described technologies, annotations can be created by different people, using different devices, and sometimes in a distributed setting. Integrating these annotations can create a valuable tool for later viewing of a video stream, or viewing of the video stream by a different user.

A method of viewing audio-video presentations is described by He et al. in "Auto-Summarization of Audio-Video Presentations," *Proceedings of ACM MultiMedia '99* (1999). In He, the access patterns of users of an audio-visual presentation are used to summarize the presentation. The importance of a particular segment of an audio-visual presentation is determined, for example, based upon the number of viewers who stopped or started the presentation at that point or segment at a given time or within a given time period. Alternatively, the importance of a particular segment of an audio-visual presentation can be determined based simply upon the number of viewers who have viewed that segment of the presentation.

Another example of a method of viewing a video presentation is presented in Li et al., "Browsing Digital Video," *Proceedings of CHI* 2000 (2000). In Li, students were asked to summarize the main points of a classroom presentation. A time constraint was placed on the students so that they could not watch the entire video. Li discovered that users who employed a table of contents computed by slide changes during the classroom presentation were able to view a greater portion of the presentation. The method of viewing provided by Li relies on intrinsic features of the presentation (slide changes).

Correia et al., "Active Video Watching Using Annotation," *ACM Multimedia '99* (1999), alludes to the possibility of integrating content provided by various users with regard to a video presentation. Correia states that with suitable tools, combining content provided by a plurality users, with respect to a single audio or visual presentation, would enable the creation of participatory communities. Thus, viewers of a particular television program or audio presentation can share opinions, ideas and comments, using the medium that originated the opinion, idea or comment.

Various systems and methods for weighting a document based on its popularity are known. For example, search engines, such as GOOGLE®, weight textual documents (web pages) based on the number of users who access or use the particular document. Likewise, online retailers, such as AMAZON.COM®, suggest books based upon the number of e-consumers who purchase the book. Resnick et al., "An Open Architecture for Collaborative Filtering of Netnews," *Proceedings of CSCW '94* (1994) presents the concept of filtering to recommend popular documents, as applied to Usenet News. In Goldberg et al., "Using Collaborative Filtering to Weave an Information Tapestry," *CACM,* 35(12), pp 51-60 (December 1992), collaborative filtering is employed to emphasize popular e-mail messages from a larger collection. In Balabanovic et al., "Content-Based, Collaborative Recommendation," *CACM,* 40(3), pp 66-72 (1997), a method for providing recommendations of popular web pages is suggested. Hill et al., "Recommending and Evaluating Choices in a Virtual Community of Use," *Proceedings of CHI '95* (1995) describes a method of recommending particular movies or music, based upon the popularity of the item. In these systems, users state preferences for an entire item or document, i.e. a compact disc, a DVD or a book, often through explicit ratings or scores. Some methods consider various forms of user activity as an implicit preferential statements.

Systems and methods are also known for weighting particular portions of a document based on its popularity. He proposes methods for weighting a particular portion of a video presentation. According to He, a portion of video is deemed to be more 'valuable' based upon the number of times an entry in the table of contents is used to select that specific segment of the video. In He's method, the most popular segments of a video are assumed to contain the most significant information.

Various systems and methods for viewing annotated documents are also known. For example, U.S. patent application Ser. No. 09/951,733, incorporated herein in its entirety by reference, describes systems and methods for emphasizing particular annotations in an annotated document. The function of emphasizing annotations is performed by considering the frequency and type of annotation made, and whether comments are included or associated with the annotation. The above-described systems and methods permit a user to view a document that has been annotated, and readily view portions that are determined to merit emphasis.

SUMMARY OF THE INVENTION

While the above described systems and methods for viewing and/or emphasizing documents or portions of documents are useful, enhanced systems and methods of filtering and viewing media, which provide ease of use and more accurate recommendations will be of value. This invention is directed to systems and methods of filtering and viewing multimedia or video streams, that include, among other features, superior analysis of collaborative indexes of annotations of multimedia or video streams and superior visualization techniques to support effective retrieval and browsing of an annotated multimedia or video stream.

Various forms of remote interaction with multimedia or video streams are known. Technologies associated with distance learning or video conferencing allow a large number of users to view a multimedia or video presentation in real time from remote locations, or asynchronously, while taking notes or marking important portions of the multimedia or video stream. These marks or notes associated with the multimedia or video stream can be referred to as annotations. Annotations can be limited to a time stamp, or can include content, such as text or actual marking on frames of the multimedia or video stream.

The systems and methods according to this invention use natural activity, such as annotating, performed by users to identify and subsequently recommend segments of multimedia or video content. Patterns of interaction, such as patterns of annotations, used with the multimedia or video presentation are useful to understand which events lead to questions, possibly permitting the creator of the multimedia or video stream to refine the presentation to make that presentation clearer for future users. These patterns can also be beneficial to new users who wish to asynchronously view the presentation. These new users could benefit from the annotations made by previous viewers in order to quickly access important segments of the multimedia or video stream. Merging the annotations made by previous users can be useful to permit a group of people to collaborate around a multimedia or video stream, particularly if adequate visualizations of the annotations and associated multimedia or video stream are provided.

Annotations can be assigned lesser or greater value to subsequent users based upon a number of different heuristics. The heuristics can include any particular characteristic of the annotation that is deemed to be of value. Such analysis of the annotations can take into consideration some or all of the users that have made annotations. Alternatively, for a particular user, annotations can be assigned a high or low value depending on which user created a particular annotation. For example, annotations created by users that are trusted or users having similar interests could be deemed to be more valuable. Systems and methods that are capable of identifying similar or trustworthy users based upon annotating behavior, thus, would also be valuable. This recommendation of high-value users could be useful to make recommendations with regard to other video streams that a particular user has not already viewed or annotated.

This invention separately provides systems and methods for filtering and viewing collaborative indexes of annotations of a multimedia or video stream.

This invention separately provides systems and methods for determining high value annotations of a multimedia or video stream.

This invention separately provides systems and methods for determining high value annotations of a multimedia or video stream based upon one or more heuristics.

This invention separately provides systems and methods for determining high value annotations of a multimedia or video stream based upon the identity of the annotator and the relatedness of that annotator to the instant user.

In various exemplary embodiments, the systems and methods of this invention include obtaining a multimedia or video stream, obtaining user indexes of annotations of the multimedia or video stream, merging the indexes, associating portions of the multimedia or video stream with the annotations, determining high-value annotations and displaying the high-value annotations.

In various exemplary embodiments, the systems and methods of this invention include providing useful visualizations of the indexes of annotations and the high value annotations.

These and other features and advantages of this invention are described in or are apparent from the following detailed description of various exemplary embodiments of the systems and methods according to this invention.

BRIEF DESCRIPTION OF THE DRAWINGS

Various exemplary embodiments of this invention will be described in detail with respect to the following drawings, in which like reference numerals indicate like elements, and wherein.

DETAILED DESCRIPTION OF EXEMPLARY EMBODIMENTS

Figure 1:
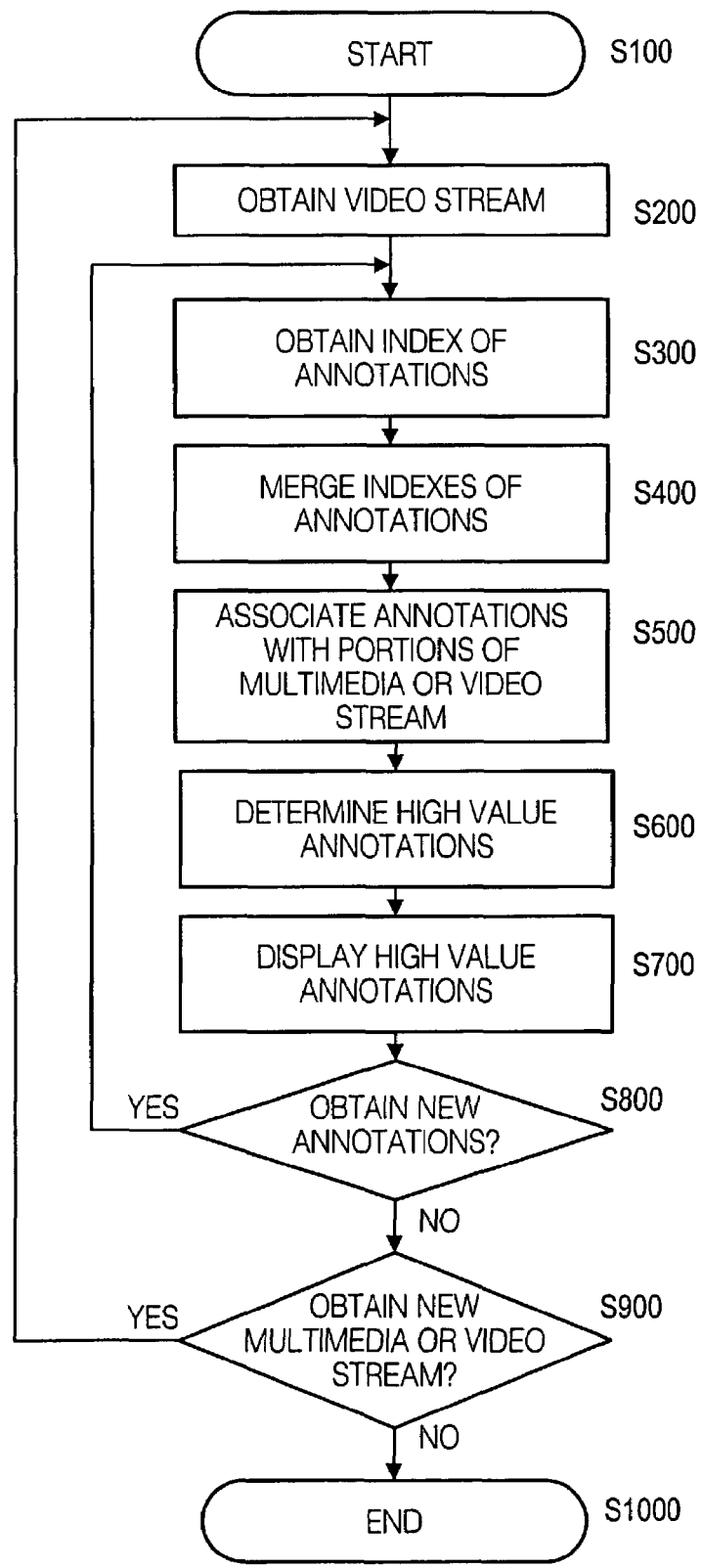
FIG. 1 is a flowchart outlining one exemplary embodiment of a method for filtering and viewing collaborative indexes of annotations of a multimedia or video stream according to this invention.

FIG. 1 is a flowchart outlining one exemplary embodiment of a method for filtering and viewing collaborative indexes of a multimedia or video stream. As shown in FIG. 1, beginning in step S100, operation continues to step S200, where a multimedia or video stream is obtained. The multimedia or video stream can be obtained by any known or later-developed method for storing or recording a multimedia or video stream.

Then, in step S300, one or more indexes of user annotations of the video stream are obtained. Annotations can be obtained by any known or later-developed technology for bookmarking or annotating multimedia or video streams. Annotations can include bookmarks limited to a time stamp, or longer annotations, where the annotations themselves include content. Technology for note-taking on laptops, pen-based notebook computers and personal digital assistants have been developed. Various ways of bookmarking interesting points in a meeting or annotating video streams have been devised using anything from key tags to wireless telephones. These annotations can be time stamped to correlate the annotations with the course of the multimedia or video stream. The annotations can be stored as the annotations are made. Alternatively, an index of user annotations can be stored subsequent to creating the index. Real-time users can annotate a video stream in real time using systems or methods including, but not limited to, LITEMINUTES, NOTELOOK, DYNOMITE or NOTEPALS, all by Fuji Xerox, Co., Ltd. Asynchronous users can annotate a video stream subsequent to creation of the video stream using systems and methods including, but not limited to, MRAS by Microsoft, Inc.

Next, in step S400, the indexes of annotations that were obtained in step S300 are merged to form a collaborative index of annotations. The indexes are merged so that the indexes and the annotations themselves can be evaluated relative to each other. The indexes can be merged using any known or later-developed method which permits simultaneous analysis of the obtained indexes. In various exemplary embodiments, merging the indexes can include displaying the merged index, thus allowing a user to view the annotations made by all of the users, and browse associated portions of the multimedia or video stream, if available.

Then, in step S500, portions of the multimedia or video stream are associated with the obtained annotations. The annotations can be associated with a portion of the multimedia or video stream so that when the annotations are displayed, selecting an annotation will permit the user to view or otherwise experience the portion of the multimedia or video stream associated with the annotation. The portion of the multimedia or video stream can be associated, for example, to correlate to the time that the annotation was made. The portion of the multimedia or video stream can be of any duration or shown in any format that is suitable to the application of the method. It should be appreciated that the portions of the multimedia or video stream can be associated with the annotations at any time subsequent to obtaining the multimedia or video stream and the annotations, and prior to displaying the high value annotations.

Next, in step S600, high value annotations are determined. High value annotations are those annotations that are determined to be useful to a particular user based upon selected criteria. In determining which annotations are high value annotations, the entire merged index of annotations, or portions of the entire merged index of annotations, can be viewed to determine which bookmarks are valuable, based upon where in the time continuum of the multimedia or video stream the annotations are made. Alternatively, a particular user that is similar to the first user can be identified, and each of the bookmarks generated by that particular user can be identified as having a high value.

In step S700, the high value annotations are displayed. After the high value annotations have been determined, the annotations are displayed in a manner that permits the user to view the annotations and browse the portion of the multimedia or video stream associated with the high value annotations. The annotations may be displayed using any known or later-developed user interface. Various exemplary methods of displaying the high value annotations are set forth below in describing the systems according to this invention.

Then, in step S800, a determination is made whether new annotations are to be obtained. If so, operation returns to step S400. Otherwise, operation proceeds to step S900. In step S900, a determination is made whether any additional multimedia or video streams are to be obtained and analyzed. If so, operation jumps back to step S200. Otherwise, operation proceeds to step S1000, where operation ceases.

In various exemplary embodiments, in step S600, the merged index of annotations are evaluated to determine a confidence value of annotations made at any particular time t in the time continuum of the multimedia or video stream. The confidence value of a bookmark made at time t is:

$$C(t) = \sum_{i=1}^{i=n} \int_{s=t-\Delta t}^{s=t+\Delta t} w(t-s) \cdot m_i(s) \qquad (1)$$

where:
C(t) is the confidence value of an annotation made at a time t;
i is the user;
n is the nth user;
s is the time that a particular annotation is made;
t is the time being evaluated;
w(t−s) is a Hamming function providing a weight for the book mark made at time s; and
$m_i(s)$ is a function indicating the presence or absence of an annotation at the time s.

Figure 2:
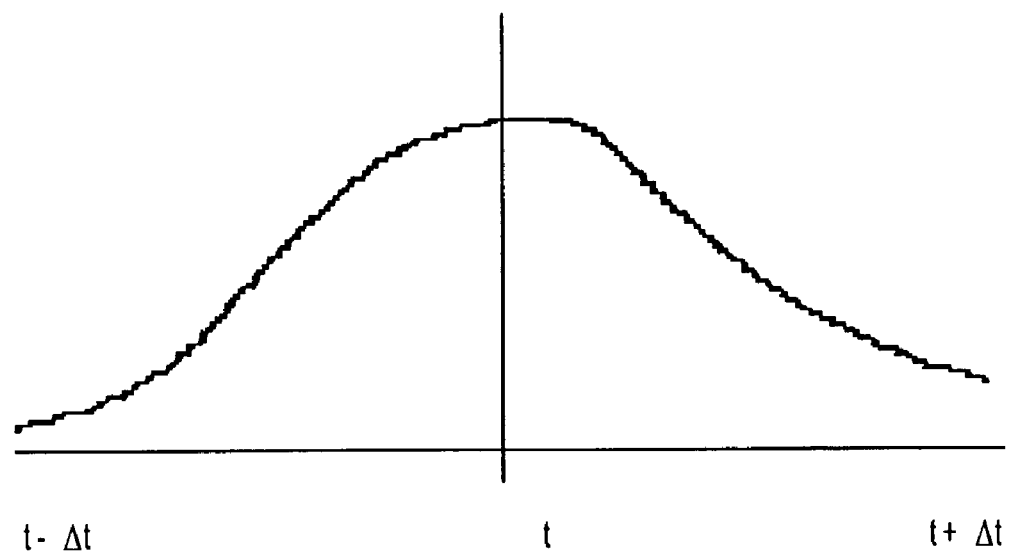
FIG. 2 is a graph illustrating the common Hamming function.
Figure 3:
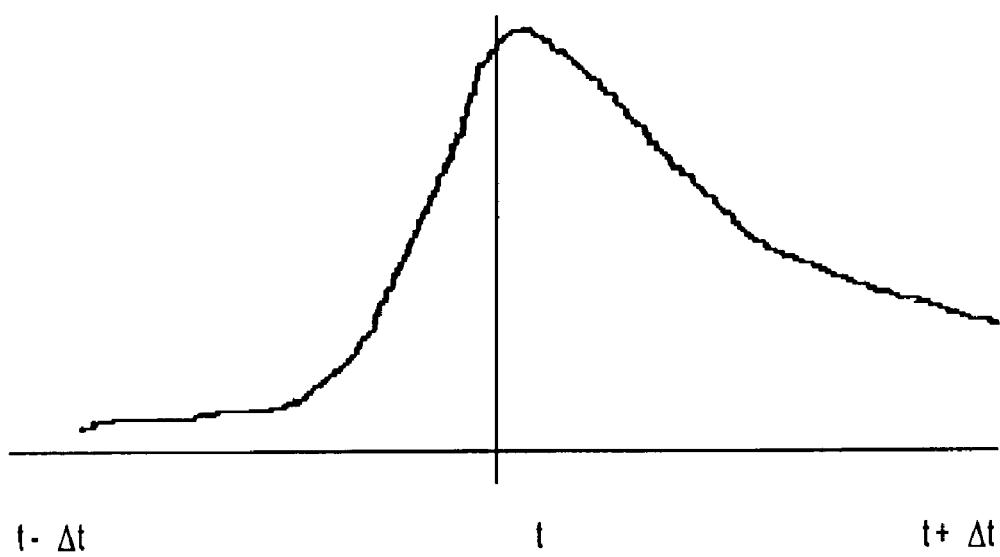
FIG. 3 is a graph illustrating a modified Hamming function.

In Eq. (1), the function w(t) is defined over a time window such as, for example, the common Hamming function. The Hamming function is illustrated in FIG. 2. The Hamming function weights annotations nearer to the center of the window (t) more heavily than annotations further away from the center of the window. In the Hamming function, at time t, the function w(t−s) is equal to 1, while moving in both the negative and positive directions toward some time t−Δt and some point t+Δt, the function approaches 0. The Hamming function need not be used, however. In various exemplary embodiments, modified Hamming functions or other functions can be used, which will more heavily weight other features of annotations. For example, one such modified Hamming function is illustrated in FIG. 3. In the function w(t−s) illustrated in FIG. 3, annotations made after t are more heavily weighted that those annotations made before t. It should be appreciated that various modifications to the Hamming function, or other appropriate functions, would be apparent to one skilled in the art.

The function $m_i(s)$ indicates whether a particular user i has made an annotation at time s. If the $i^{th}$ user made an annotation at time s, the value function equals 1, if that $i^{th}$ user did not make an annotation at time s, the value of the function is 0. Thus, Eq. (1) provides confidence scores for an annotation made at any time t, indicating the proximity of a particular annotation made at time t to all of the annotations made by other users.

The function C(t) can be modified to give more weight to some annotations than to others. In Eq. (2), a function is added to Eq. (1) to take into account the particular manner in which bookmarks are to be weighted.

$$C(t) = \sum_{i=1}^{l=n} \int_{s=t-\Delta t}^{s=t+\Delta t} w(t-s) \cdot m_i(s) \cdot W_i(s) \qquad (2)$$

where $W_i(s)$ is a weighting function.

The weighting function $W_i(s)$ can take into account any particular heuristic. For example, in various exemplary embodiments, annotations can be weighted based upon the content of the annotations. By evaluating the length of the comment or the type of annotation, the annotations can be weighted relative to each other. For example, freeform annotations, like red marks and margin bars drawn on a frame from the multimedia or video stream, are likely to be highly valuable. However, if a particular user always uses the same type of annotations, for that user this particular type of annotation is not indicative of its value. For example, when a user tends to write long comments for each bookmark, these bookmarks tend to be less valuable than if the user only occasionally provides long comments. The weighting function $W_i(s)$ can take into consideration these relationships. Annotations can also be weighted based on their frequency within a multimedia or video stream.

In various exemplary embodiments, annotations can be evaluated based upon their usage, such as by determining how many times an annotation was reviewed in collaborative indexes produced by previous iterations of the systems or methods according to this invention. When users directly jump to an annotation, this annotation can be assigned a higher value. When annotations are clustered, the value of each annotation of the cluster is increased. If such a heuristic is used, the value of each annotation can evolve in time, as more users access the collaborative index and jump to specific annotations.

Annotations can be weighted by a particular user's preferences. Alternatively, annotations can be weighted based upon which other user or users made the annotations. For example, a particular user can select only the bookmarks created by, or accessed by, one or more other users that the particular user trusts. These weights can be assigned manually by the user.

In Eq. (3) another level of evaluation is added to the function Eq. (2).

$$C(t) = \sum_{i=1}^{i=n} \int_{s=t-\Delta t}^{s=t+\Delta t} w(t-s) \cdot m_i(s) \cdot W_i(s) \cdot Sim(t, s) \quad (3)$$

where $Sim(t,s)$ is a function illustrating the similarity between an annotation made at t and an annotation made at time s.

The comparing function $Sim(t,s)$, like the weighting function $W_i(s)$, can take into account any particular heuristic in comparing annotations made at time t and annotations made at time s. For example, the annotations can be compared based on time. In various exemplary embodiments, annotations can be evaluated by computing a distance, based on any desired metric, between the annotations. In some such embodiments, the closer the creation times t and s are for annotations, the more similar those annotations are. Instead of using a linear function, such as time difference, in various exemplary embodiments, a non-linear function, such as, for example, the Hamming functions described above that weight bookmarks differently based on their proximity to the time t, can be used.

In various exemplary embodiments, annotations can be compared based upon their textual similarity to other annotations. Where annotations include text, such as notes taken by the user regarding the multimedia or video stream, a comparison of the text strings of the annotations can be performed to determine the similarity between the two or more annotations.

In various exemplary embodiments, annotations can include notes or marks made directly onto one or more frames of the multimedia or video stream. These marks can be compared with marks made by other users. When users can draw and write on top of a frame in the multimedia or video stream, marks which are similar in appearance or similar in location on the frame can be identified.

In various exemplary embodiments, annotations can be compared relative to the frames with which those annotations are associated. For example, annotations that are made with respect to frames in the multimedia or video stream can be compared in terms of the similarity of the frames against which the annotations are made. Annotations that are associated with the same cluster are more similar than annotations associated with different clusters.

In various exemplary embodiments, high value annotations are determined by comparing two users' indexes. For example, a profile can be formed based on a collection of annotations created with respect to a collection of multimedia or video streams. As with the comparison of individual annotations, described above, the similarity between the indexes of annotations of two or more users can also be computed taking into consideration time similarity, text similarity, mark similarity and video features, or any other attributes of the annotations that are deemed to be important.

In various exemplary embodiments, the similarity between two users can increase as these users create similar marks. In Eq. (4), a function is provided for assessing the similarity between two users, based upon the annotations of a single multimedia or video stream. The similarity between a first user B1 and a second user B2 is given by:

$$Sim(B1, B2) = \sum_{t=0}^{t=T} \int_{s=t-\Delta t}^{s=t+\Delta t} w(t-s) \cdot sim(b1(t), b2(s)) + \quad (4)$$
$$\sum_{t=0}^{t=T} \int_{s=t-\Delta t}^{s=t+\Delta t} w(t-s) \cdot sim(b2(t), b1(s))$$

where:

$Sim(B1,B2)$ is the similarity between a first user B1 and a second user B2;

s is the time that a particular annotation is made;

t is the time being evaluated;

$w(t-s)$ is the weight for the annotation made at s;

$sim(t,s)$ is the similarity between the annotation made at t and the annotation made at s;

$b1(t)$ is a function describing the presence or absence of annotations made by user B1;

$b2(t)$ is a function describing the presence or absence of annotations made by user B2.

It should be appreciated that, in various exemplary embodiments, the function described in Eq. (4) can be modified by adding one or more weighting and/or comparing functions as described with respect to Eqs. (2) and (3). In some such exemplary embodiments, the presence or absence of an annotation can have different implications. For example, when a first user does not create a mark where or when a second user does, the function can be defined such that this does not negatively impact the similarity between these two users. Conversely, in applications where it is desirable to emphasize the differences between users, when a first user does not create a mark where or when a second user does, the function can be defined such that this negatively impacts the similarity between these two users. One way of effecting such emphasis is to define $b1(t)$ and $b2(t)$ such that the functions are equal to one if there is an annotation at a particular time t, and equal to zero if there is not an annotation at time t.

In various exemplary embodiments, instead of comparing users based directly based upon the users' corresponding annotations, users can be compared based upon the groups of annotations where the users' annotations are clustered.

Figures 4, 5, 6:
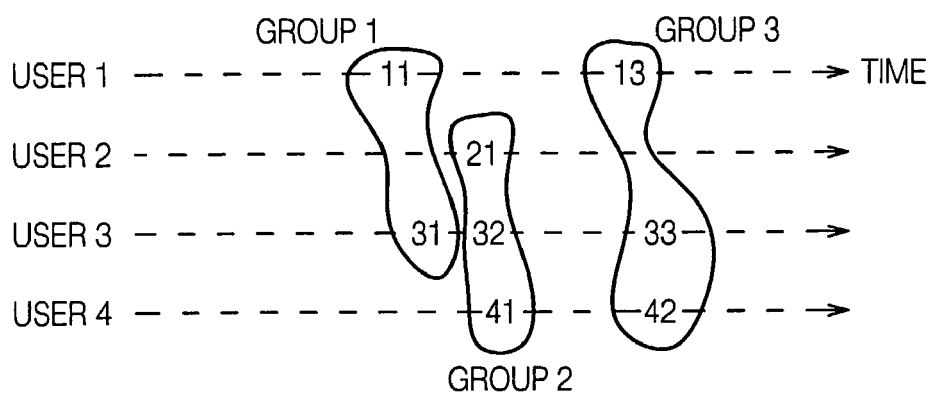
FIG. 4 is a graphical rendering of annotations made by four users of a single video stream.
FIG. 5 is a graphical rendering of groupings that could be assigned to the hypothetical users of FIG. 4.
FIG. 6 is an alternative graphical rendering of the group membership of the hypothetical users of FIG. 4.

Groups can be created by any known or later-developed method. For example, groups can be created by applying traditional clustering algorithms like the Hierarchical Agglomerative Clustering algorithm. Creating groups in this manner is described, for example, in U.S. Pat. No. 5,889,523 to Wilcox et al., incorporated herein by reference in its entirety. FIG. 4 illustrates indexes of annotations made by four different users. The annotations are combined into hypothetical groups that could by created by a clustering algorithm. In various exemplary embodiments, groups are created by identifying the two most similar annotations. In the example shown in FIG. 4, it is assumed that the similarity function used to identify similar annotations is simply a function of the time separating two annotations. However, it should be appreciated that the annotations could be compared using a function for any particular heuristic, including, but not limited to, the heuristics set forth above. In FIG. 4, the pairs of annotations {21, 32} and {33, 42} are created first. Various techniques could be employed to then recursively find the two closest groups of annotations. In the example shown in FIG. 4, such a method could lead to the following groupings: {21,32,41}, {33,42,13} and {11,31}.

In the example illustrated in FIG. 4, the "31" annotation is not grouped with the group or cluster {32,21,41} because the "32" annotation was found to be more similar to the "21" and "41" annotations. In particular, and in the exemplary technique used to create the groupings shown in FIG. 4, annotations created by the same user should not be grouped together. Therefore, the "31" annotation is grouped with the "11" annotation. Various algorithms can be employed that stop grouping when a predefined threshold is reached in the similarity between two groups of annotations. Presumptions can be made based on the grouping, such as, for example, the more annotations that are in a group, the more valuable that group is. Each user can then be represented by the groups that user belongs to. Users can then be compared to each other based on the groups the users belong to.

Having determined groups, and perhaps recommended annotations of a particular group to a user, in various exemplary embodiments, users can be compared based upon the groups that each user's annotations belong to. A matrix can be created that identifies the groups that an individual user belongs to. Referring to the example illustrated in FIG. 4, FIG. 5 illustrates the group membership of each of the users in FIG. 4. In FIG. 6, the data pertaining to group membership is reconfigured to illustrate the similarity of users based on the common groups to which they belong. The similarity of users based upon group membership can be given by Eq. (5).

$$\text{Similarity}(\text{user}_i, \text{user}_j) = \frac{\sum_{n=1}^{n=3} \text{Grouped}(\text{user}_i, n) * \text{Grouped}(\text{user}_j, n)}{N} \quad (5)$$

where:

Similarity(user$_i$,user$_j$) is the similarity of user i and user j as a function of group membership;

Grouped(user$_i$, n) is a function illustrating whether a user i is a member of a group n, the function gives 1 or 0 depending if this user is grouped into group n; and N is the number of users.

Once users can be compared, either directly from their bookmarks or from the groups of bookmarks they belong to, similar users can be detected and recommendations can be made. In various exemplary embodiments, the similarities between a first user and a second user with respect to a first multimedia or video stream can be stored, and recommendations of annotations can be made with respect to a second multimedia or video stream based upon the similarities of the annotations made with respect to the first multimedia or video stream.

It should be appreciated that the functions described in Eqs. (1)-(4) are described as functions of time only for the sake of illustration. High value annotations can be determined as a function of any quantifiable heuristic of annotations, and such variations are specifically contemplated by the systems and methods according to this invention. Likewise, any combination of weighting or comparing functions can be employed to determine high value annotations, and multiple weighting functions and/or comparing functions can be added or removed in any of Eqs. (1)-(4).

Figure 7:
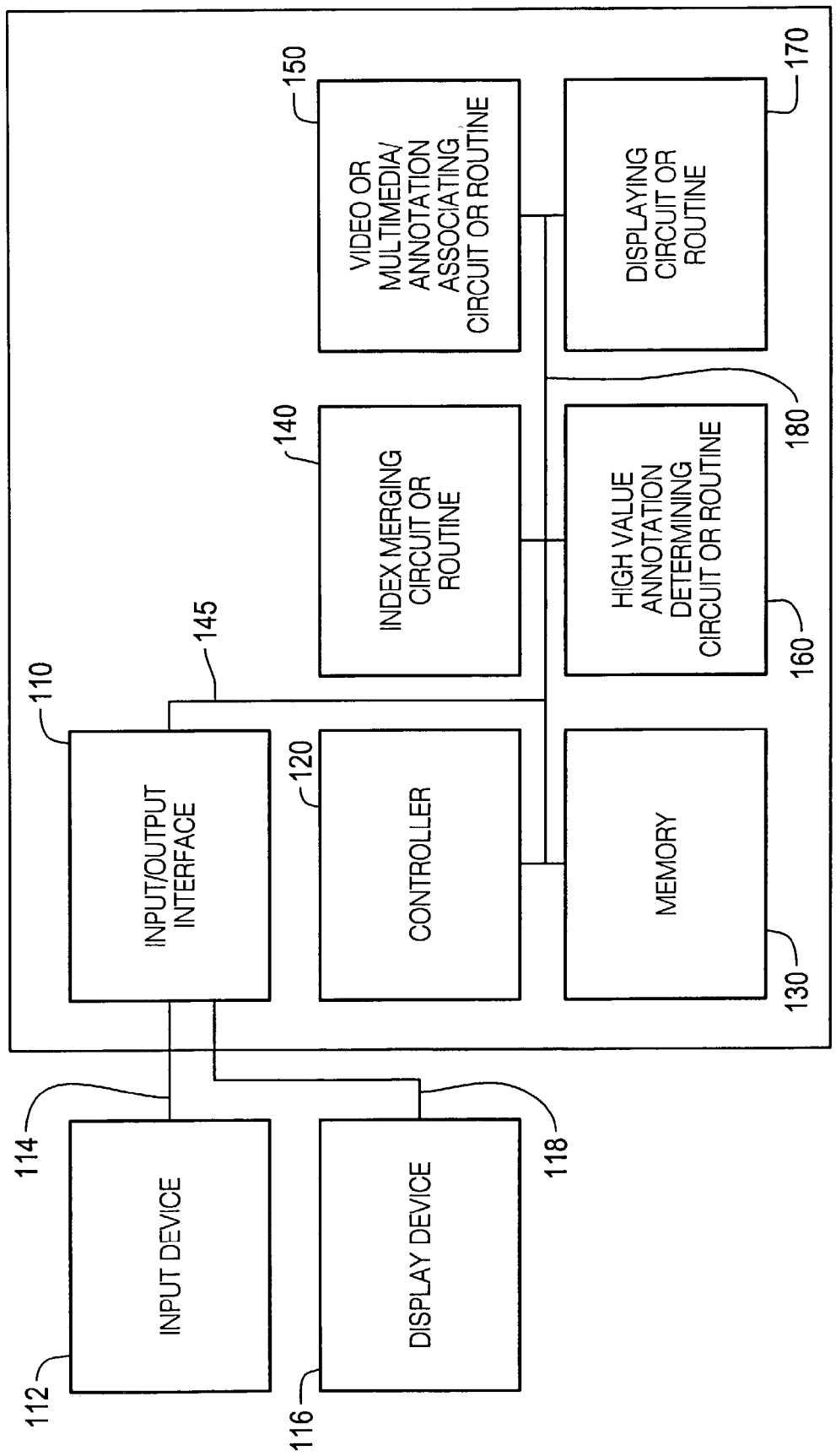
FIG. 7 is a functional block diagram showing one exemplary embodiment of a system for filtering and viewing collaborative indexes of annotations of a multimedia or video stream according to this invention.

FIG. 7 is a functional block diagram of one exemplary embodiment of a filtering and viewing system 100 according to this invention that is usable to filter a collaborative index of a multimedia or video stream as discussed above, and to controllably display a user interface via a display device 116 to allow a user to identify, select and view high value portions of the multimedia or video stream. As shown in FIG. 7, the filtering and viewing system 100 includes an input/output interface 110, a controller 120, a memory 130, an index merging circuit or routine 140, a multimedia or video stream/annotation associating circuit or routine 150, a high value annotation determining circuit or routine 160, and a displaying circuit or routine 170, interconnected by one or more data/control buses, application programming interfaces or the like 145. One or more input devices 112 and one or more display devices 116 are connected by one or more links 114 and one or more links 118, respectively, to the input/output interface 110.

The memory 130 shown in FIG. 7 can be implemented using either or both of alterable or non-alterable memory. The alterable portions of the memory 130 are, in various exemplary embodiments, implemented using static or dynamic RAM. However, the alterable portions of the memory 130 can also be implemented using a floppy disk and disk drive, a writable optical disk and disk drive, a hard drive, flash memory or the like. The non-alterable portions of the memory 130 are, in various exemplary embodiments, implemented using ROM. However, the non-alterable portions can also be implemented using other non-volatile memory, such as PROM, EPROM, EEPROM, an optical ROM disk, such as a CD-ROM or a DVD-ROM, and disk drive, or other non-alterable memory, or the like.

In general, the one or more input devices 112 will include any one or more of a keyboard, a keypad, a mouse, a track ball, a track pad, a touch screen, a microphone and associated voice recognition system software, a joy stick, a pen-based system, or any other known or later-developed system for providing control and/or data signals to the filtering and viewing system 100. The one or more input devices 112 can further include any manual or automated device usable by a user or other system to present data or other stimuli to the filtering and viewing system 100. For example, the one or more input devices 112 can include any known or later-developed device or technology suitable for note taking or annotating a multimedia or video stream, such as a remote laptop computer, pen-based notebook computer or personal digital assistant. The one or more input devices 112 can further include other devices for bookmarking or annotating a multimedia or video stream such as key tags or cellular telephones.

The link 114 can be any known or later-developed device or system for connecting the one or more input devices 112 to the filtering and viewing system 100, including a direct cable connection, a connection over a wide area network or a local area network, a connection over an intranet, a connection over the Internet, or a connection over any other known or later-developed distributed processing network or system. In general, the link 114 can be any known or later-developed connection system or structure usable to connect the one or more input devices 112 to the filtering and viewing system 100. The link 114 can further encompass any known or later-developed device or devices for wirelessly connecting remote devices.

In operation, the user operates the filtering and viewing system 100 to display high value annotations on the display device 116, and to further display a portion of the multimedia or video stream associated with a particular high value annotation when that high value annotation is selected. First, one or more multimedia or video streams are submitted to the filtering and viewing system 100. The one or more multimedia or video streams need not be obtained by the user operating the filtering and viewing system 100 to display high value annotations. The one or more multimedia or video streams may have been created or recorded by another user prior to use by the instant user. The multimedia or video stream can be submitted to the filtering and viewing system 100 using one or more of the one or more input devices 112 that are suitable for submitting a multimedia or video stream simultaneously with the occurrence of the subject matter of the multimedia or video stream. Alternatively, the one or more input devices 112 can include a device or devices that are usable to transmit or convey a previously recorded multimedia or video stream to the filtering and viewing system 100.

As indicated above, one or more of the one or more input devices 112 are also used to submit one or more indexes of annotations to the filtering and viewing system 100. As with obtaining multimedia or video streams, the one or more indexes of annotations need not be obtained by the user operating the filtering and viewing system 100 to display high value annotations. The one or more indexes of annotations may have been created prior to use by the instant user. The annotations can include, but are not limited to, time stamps, annotations which include content, such as notes on a particular multimedia or video stream, or marks made directly on various frames of the multimedia or video stream. The one or more indexes of annotations can be submitted to the filtering and viewing system 100 as they are made or, alternatively, an index of annotations can be submitted to the filtering and viewing system 100 subsequent to making the annotations. The multimedia or video stream and the various indexes of annotations obtained from the one or more input devices are then stored by the controller 120 in the memory 130.

The controller 120 then provides one or more of the one or more indexes of annotations stored in the memory 130 to the index merging circuit or routine 140. The index merging circuit or routine or routine 140, under control of the controller 120, merges the one or more indexes of annotations stored in the memory 130 to create a collaborative index for later analysis of the annotations. Upon completion of the index merging operation by the index merging circuit or routine 140, the controller 120 stores the merged index in memory 130.

The controller 120 then provides at least some of the annotations from the merged index of annotations stored in the memory 130 to the multimedia or video stream/annotation associating circuit or routine 150. The multimedia or video stream/annotation associating circuit or routine 150, under control of the controller 120, associates a portion of the multimedia or video stream with one or more of the annotations retrieved from the memory 130. Upon completion of the multimedia or video stream/annotation associating operation by the multimedia or video stream/annotation associating circuit or routine 150, the controller 120 stores the annotations with associated portions of the multimedia or video stream in memory 130. Associating a portion of the multimedia or video stream with an annotation can involve associating a portion of the multimedia or video stream, or merely associating a cue that permits the filtering and viewing system 100 to display a portion of the multimedia or video stream when the user selects an annotation.

The controller 120 then accesses at least some of the annotations and, in various exemplary embodiments, the selected heuristics stored in the memory 130 and supplies the accessed annotations and/or heuristics to the high value annotation determining circuit or routine 160. The high value annotation determining circuit or routine 160, under control of the controller 120, selects high value annotations for display. Selecting high value annotations can be performed by executing one or more of the methods for evaluating annotations set forth above. Upon completing the high value annotation determining operation performed by the high value annotation determining circuit or routine 160, the controller 120 stores the high value annotations selected by the high value annotation determining circuit or routine 160 in the memory 130.

The controller 120 then accesses at least some of the high value annotations with associated portions of the multimedia or video stream stored in the memory 130 and provides the accessed data to the displaying circuit or routine 170. The displaying circuit or routine 170, under the control of the controller 120, creates or modifies a user interface for displaying the high value annotations with associated portions of the multimedia or video stream. Upon completion of the displaying operation by the displaying circuit or routine 170, the controller 120 then stores the user interface generated by the displaying circuit or routine 170 in the memory 130.

The controller 120 then accesses the user interface generated or modified by the displaying circuit or routine 170 from the memory 130 and displays the user interface on the display device 116. When the user selects one of the high value annotations in the user interface displayed on the display device 116, the controller 120 provides the associated portions of the multimedia or video stream, which are displayed on the display device 116. The user may subsequently submit new annotations, identify a new multimedia or video stream for analysis, or select one or more new heuristics to repeat operation of the filtering and viewing system 100.

Figure 8:
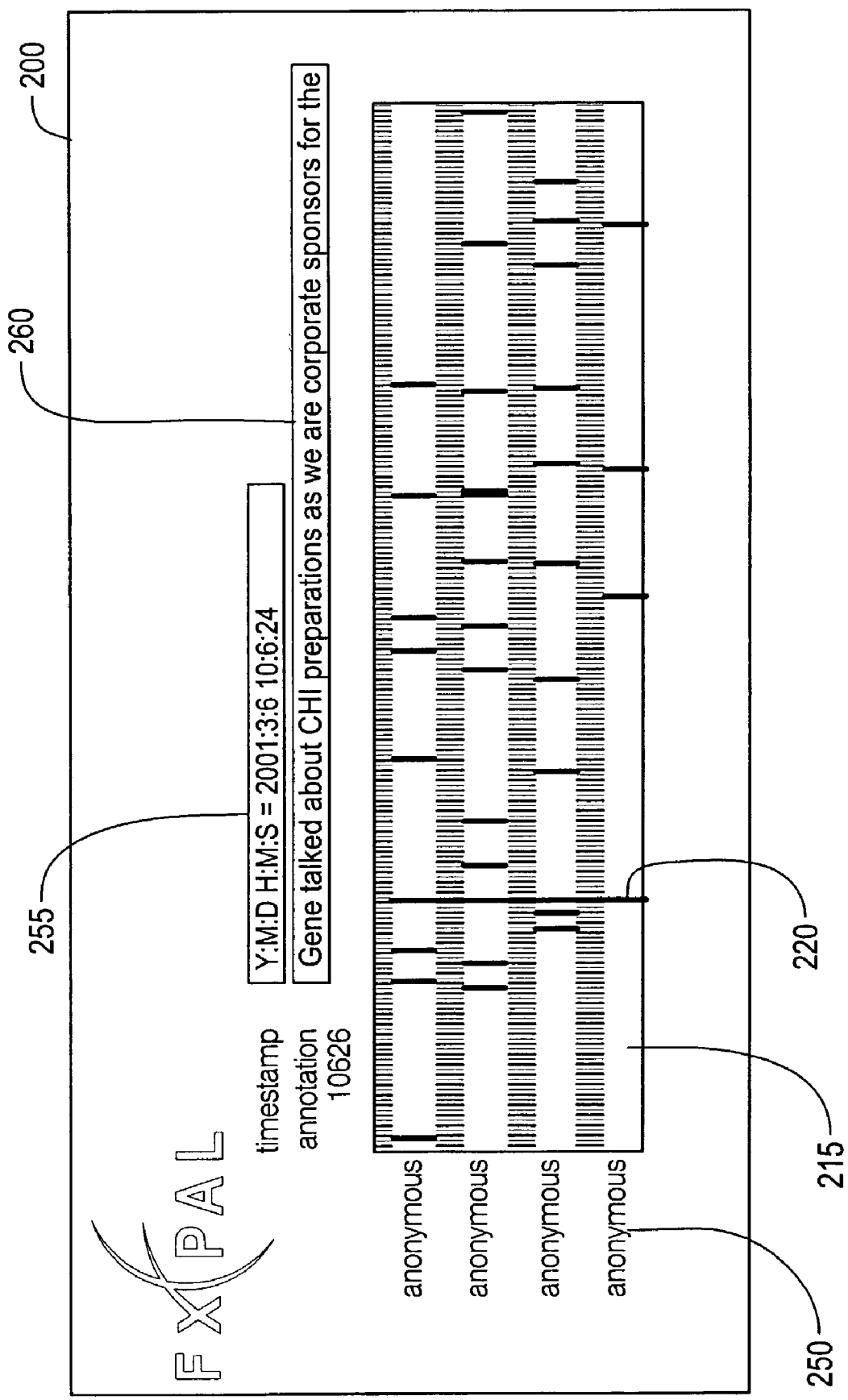
FIG. 8 illustrates a first exemplary embodiment of a user interface according to this invention usable to view a collaborative index of annotations of a multimedia or video stream.

FIG. 8 illustrates a first exemplary embodiment of a user interface 200 usable to view a collaborative index of annotations of a multimedia or video stream according to this invention. The user interface 200 includes one or more annotation display boxes 215 in which annotation icons 220 are displayed. Each annotation display box 215 includes a user identification tag 250 that identifies the user that created the annotations. The user interface 200 also includes a time stamp text box 255 that displays the time at which an annotation is made and the identity of the user that made each annotation. The user interface 200 also includes an annotation text box 260 that displays the text, if any, associated with an annotation.

In operation, a user selects an annotation icon 220 displayed in the annotation display box 215 by pointing to the annotation icon 220 on the user interface 200 and selecting the annotation icon 220.

In response, data is displayed in the time stamp text box 255 and the annotation text box 260. The data that is displayed in the text boxes 255 and 260 are the timestamp signature of the annotation associated with the selected annotation icon 220. In various exemplary embodiments, selecting an annotation icon 220 can cause a portion of a multimedia or video stream associated with the selected annotation to be displayed. Displaying can be executed using any known or later-developed media player.

Figure 9:
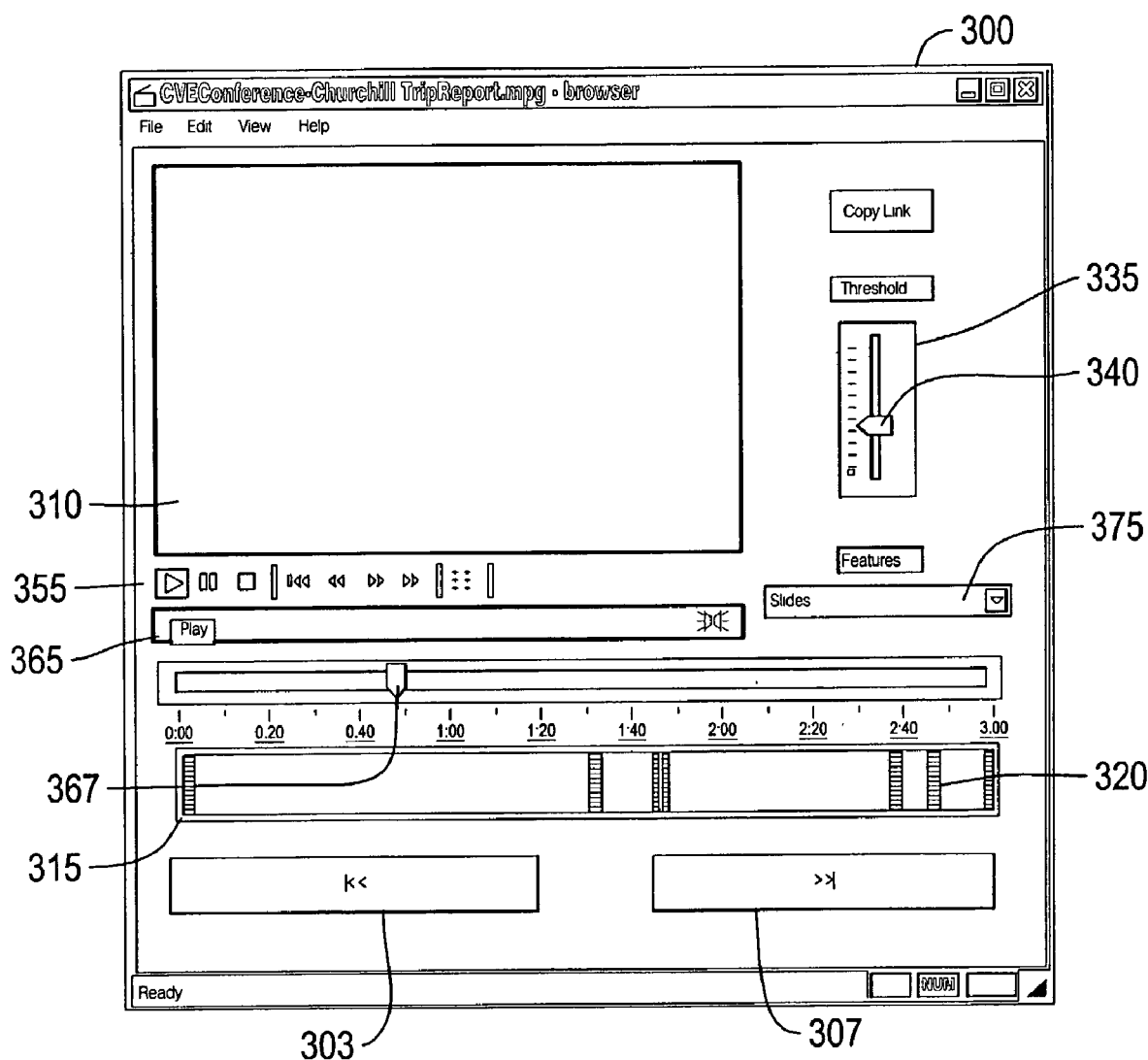
FIG. 9 illustrates a second exemplary embodiment of a user interface according to this invention usable to view a collaborative index of annotations of a multimedia or video stream.

FIG. 9 illustrates a second exemplary embodiment of a user interface 300 according to this invention usable to view a collaborative index of high value annotations of a multimedia or video stream. The user interface 300 includes an annotation display box 315 in which annotation icons 320 are displayed. Each annotation icon 320 identifies the user who made the annotation by modifying a display feature of the annotation icon 320, such as a color or shape, based on that user. The user interface 300 also includes a video display box 310. Associated with the video display box are VCR buttons 355, a status box 363 and a temporal indicator box 365. The temporal indicator box 365 includes a temporal slider bar 367. The user interface 300 also includes a threshold slider bar 340 located within a threshold selector box 335. The user interface 300 further includes annotation scanning buttons 303 and 307 and a features list drop box 372.

In operation, a user uses the threshold slider bar 340 to select the level of confidence of annotations that the user desires to view. In response, annotation icons 320 are displayed in the annotation display box 315 for those annotations meeting the threshold confidence value. The user can select any of the displayed annotation icons 320 by selecting the desired icon. As a result, a portion of a multimedia or video stream associated with that icon is displayed in the video display box 310. The user can choose the manner in which the multimedia or video stream associated with a particular annotation is viewed by selecting a feature from the features list drop box 372. The features include any known or later-developed manner of showing a multimedia or video stream or portions of the multimedia or video stream. The user can operate the annotation scanning buttons 303 and 307 to cue through portions of the multimedia or video stream associated with each of the displayed annotation icons 320.

In addition to viewing a multimedia or video stream in a manner that emphasizes the annotations made with respect to that multimedia or video stream, the features of the user interface 300 permit a user to view the multimedia or video stream as one would conventionally view a multimedia or video stream. Such features include the VCR buttons 355, the status box 363 and the temporal indicator box 365. The VCR buttons 355 permit operation in the manner that one operates a VCR (i.e., play, stop, pause, etc.) The status box 363 identifies the current status of the multimedia or video stream (i.e., playing, paused, etc.) The temporal indicator box 365 provides a visual identification of the portion of the multimedia or video stream currently in the video display box 310 relative to the beginning and ending points of the multimedia or video stream. The user can place the temporal slider bar 367 in a location within the temporal indicator box 365, and the portion of the multimedia or video stream associated with that location will appear in the video display box 310.

Figure 10:
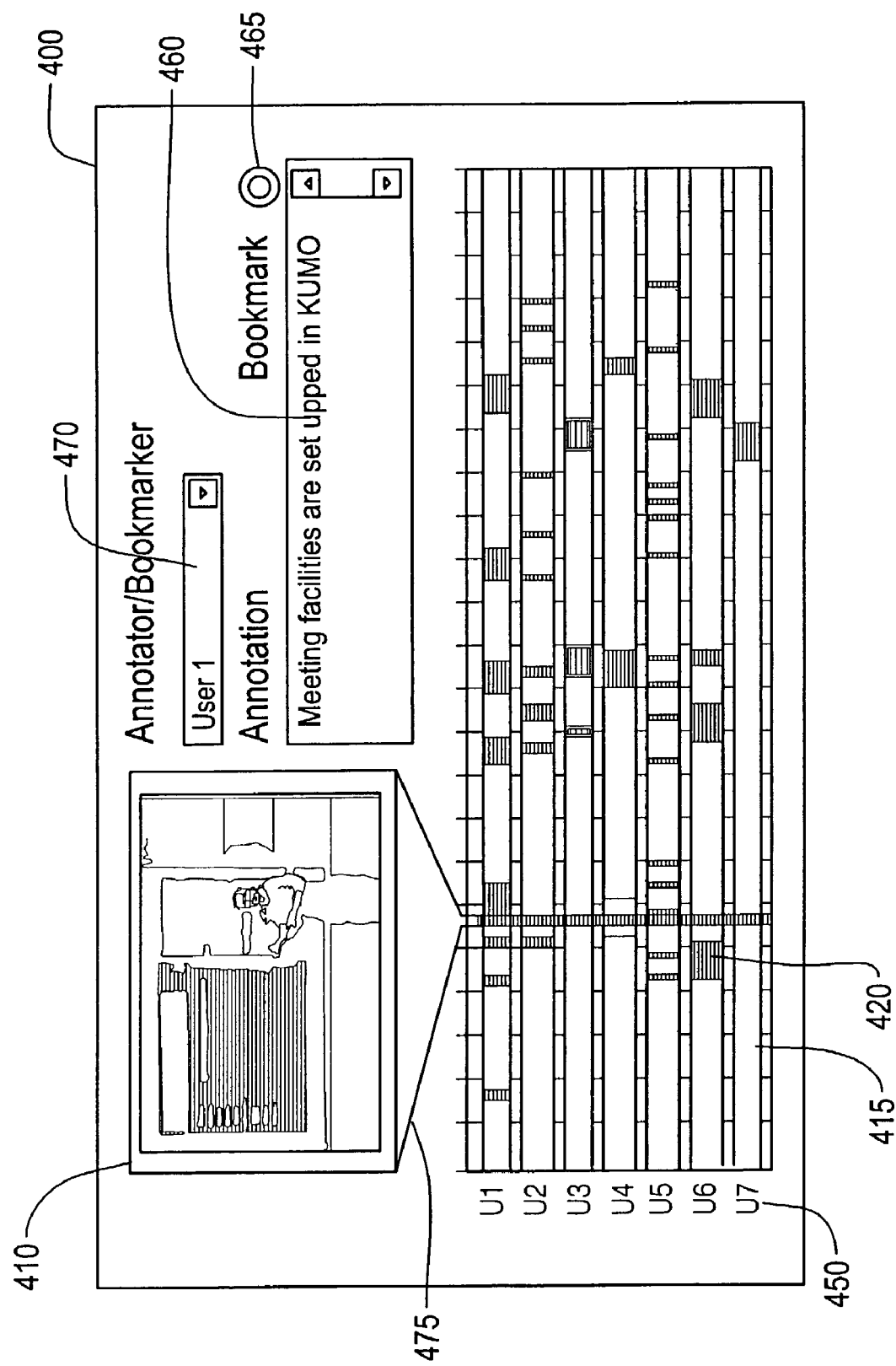
FIGS. 10 illustrates a third exemplary embodiment of a user interface according to this invention usable to view a collaborative index of high value annotations of a video stream.

FIG. 10 illustrates a third exemplary embodiment of a user interface 400 according to this invention usable to view a collaborative index of annotations of a multimedia or video stream. The user interface 400 includes one or more annotation display boxes 415 in which annotation icons 420 are displayed. Each annotation display box 415 includes a user identification tag 450 that identifies the user that created the corresponding annotations. The user interface 400 also includes a video display box 410 and a grouping browser 475. The user interface 400 further includes an annotation check box 465, an annotation text box 460 and a user list drop box 470. The annotation check box 465 indicates whether an annotation has been made in the portion of the annotation display boxes 415 that are highlighted by the grouping browser 475. The user list drop box 470 displays the identities of the user or users who made the annotations at the portions of the annotation display boxes 415 that are highlighted by the grouping browser 475, and permits the user of the user interface 400 to select between those users. The annotation text box 460 also includes the text, if any, associated with the one or more annotations made by the user identified in the user list drop box 470.

In operation, a user associates the grouping browser 475 with a portion of the annotation display box 410 of interest. In response a portion of a multimedia or video stream associated with an annotation icon 420 appearing within the selected portion of the annotation display box 415 is displayed in the video display box 410. Also, in response, the annotation check box 465 is highlighted if an annotation icon 420 appears in the selected portion of the annotation display box 415. Also, in response, text associated with an annotation icon 420 is displayed in the annotation text box 460 if an annotation icon 420 having associated text appears in the selected portion of the annotation display box 415, and if the user identified in the user list drop box 470 has made such a text annotation.

Figure 11:
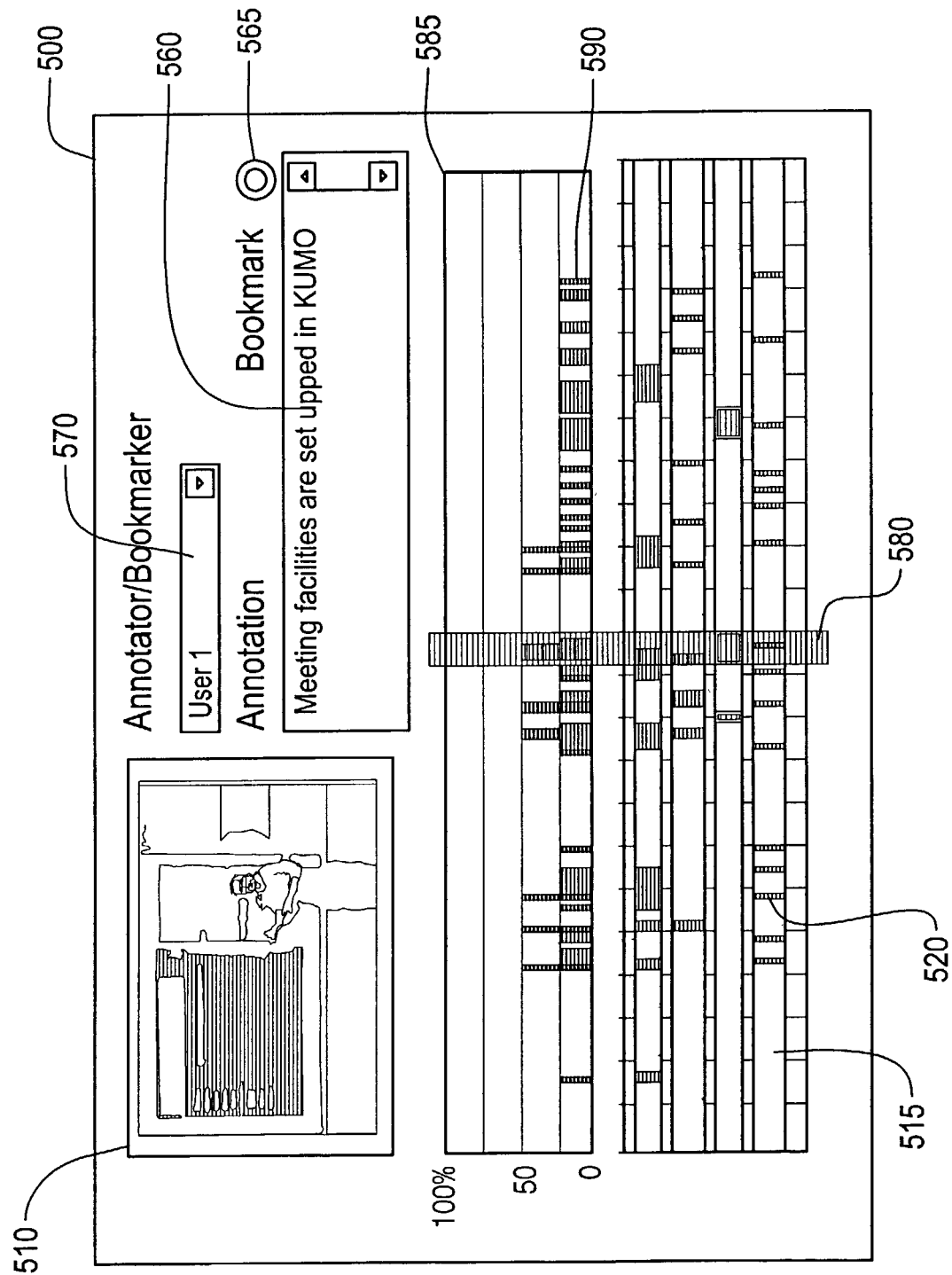
FIGS. 11 illustrates a fourth exemplary embodiment of a user interface according to this invention for viewing a collaborative index of high value annotations of a multimedia or video stream.

FIG. 11 illustrates a fourth exemplary embodiment of a user interface 500 according to this invention usable to view a collaborative index of annotations of a multimedia or video stream. The user interface 500 includes one or more annotation display boxes 515 in which annotation icons 520 are displayed. The user interface also includes a confidence display box 585 in which confidence icons 590 are displayed to provide a visual representation of the confidence scores of annotations made at any given moment in the multimedia or video stream. The user interface 500 includes a video display box 510 and a grouping browser 580. The user interface 500 further includes an annotation check box 565, an annotation text box 560 and a user list drop box 570. The annotation check box 565 indicates whether an annotation has been made in the portions of the annotation display boxes 515 that are highlighted by the grouping browser 575. The user list drop box 570 displays the identities of the user or users that made annotations at the portions of the annotation display boxes 515 that are highlighted by the grouping browser 575, and permits the user of the user interface 500 to select between those users. The annotation text box 560 also includes the text, if any, associated with the one or more annotations made by the user identified in the user list drop box 570.

In operation, a user associates the grouping browser 580 with a portion of the annotation display box 510 of interest. In response a portion of a multimedia or video stream associated with an annotation icon 520 appearing within the selected portion of the annotation display box 515 is displayed in the video display box 510. Also, in response, the annotation check box 565 is highlighted if an annotation icon 520 appears in the selected portion of the annotation display box 515. Also, in response, text associated with an annotation icon is displayed in the annotation text box 560 if an annotation icon 520 having associated text appears in the selected portion of the annotation display box 515, and if the identified in the user list drop box 570 has made such a text annotation.

Figure 12:
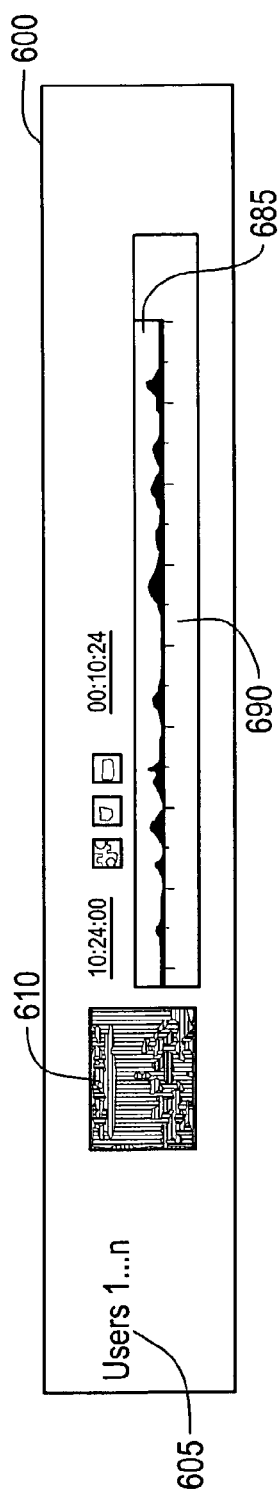
FIGS. 12, 13 and 14 illustrate a fifth exemplary embodiment of a user interface according to this invention for viewing a collaborative index of high value annotations of a multimedia or video stream.
Figure 13:
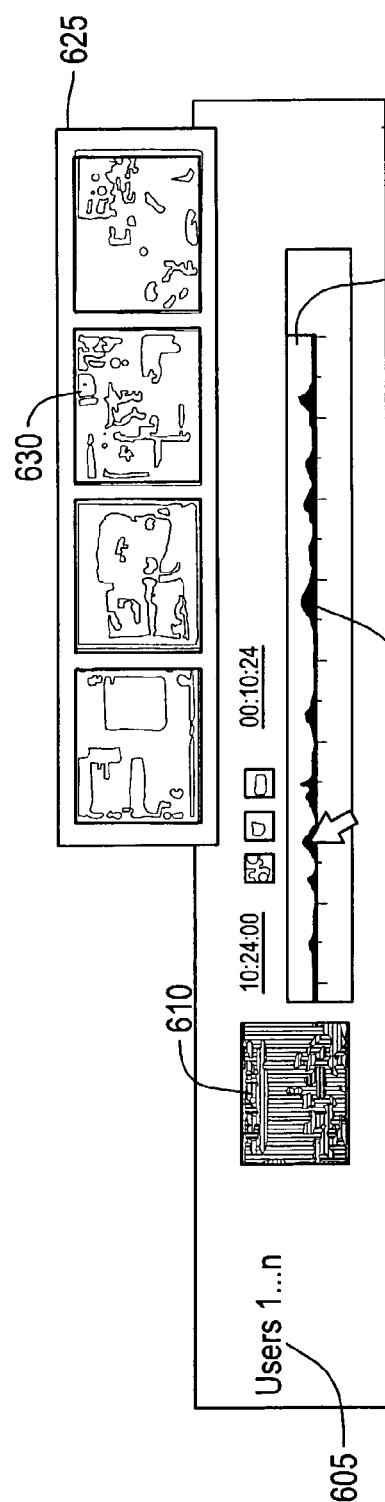
Figure 14:
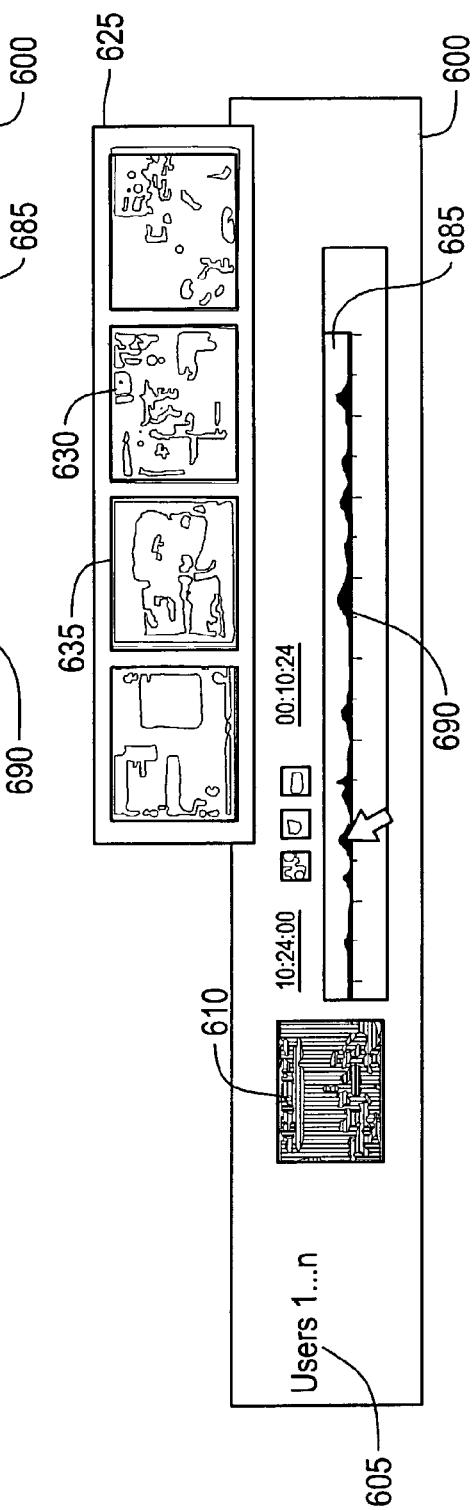

FIGS. 12, 13 and 14 illustrate a fifth exemplary embodiment of a user interface 600 according to this invention usable to view a collaborative index of high value annotations of a multimedia or video stream. The user interface 600 includes a confidence display box 685 in which confidence icons 690 are displayed to provide a visual representation of the confidence scores of the annotations made at any given moment in the multimedia or video stream. The confidence display box 685 includes a user summary tag 605 that identifies the number or identity of users that created the annotations. The user interface 600 also includes a video display box 610. As illustrated in FIG. 13, the user interface 600 also includes a multi-annotation display box 625 that includes multiple display boxes 630. FIG. 14 illustrates a highlight indicator 635 that indicates when a particular display box 630 within the multi-annotation display box 625 has been selected.

In operation, the user selects a particular location within the confidence display box 685. Each location within the confidence display box 685 represents a particular moment in the multimedia or video stream. As a result of the user's selection, a portion of the multimedia or video stream associated with the moment selected by the user is displayed in the video display box 610. If one or more users have made any annotations within a predetermined time of the selected moment, the multi-annotation display box opens, and the portions of the multimedia or video stream associated with those annotations are displayed in one or more display boxes 630 of the multi-annotation display box 625. A user can then select one of the display boxes 630 within the multi-annotation display box 625. As a result, the selected display box 630 is highlighted by the highlight indicator 635. In various exemplary embodiments, highlighting a display box 630 will result in an associated portion of the multimedia or video stream being displayed in the video display box 610. In various other exemplary embodiments, highlighting a display box 630 will result in an associated portion of the multimedia or video stream being displayed by an associated device or program.

It should be appreciated that the previous discussion is generally equally directed to standard windowed graphical user interfaces and graphical user interfaces using web-based implementations, where each graphical user interface "screen" is a distinct web page written in HTML, XML or any other known or later-developed web page authoring language. As a result, in various exemplary embodiments, the selectable icons of the previous description are implemented as hypertext links to related web pages or to distinct regions of a current web page. However, it should be appreciated that any other known or later-developed graphical user interface implementation technique could be used to implement the graphical user interface screens and/or graphical user interface elements described above.

Thus, it should also be appreciated that the graphical user interfaces according to this invention can be implemented as Windows-based systems, rather than as web-based systems. In this case, the graphical user interface screens are distinct portions of a graphical user interface that is accessed by specific Windows events that are associated with particular selectable icons or other interactive elements or widgets. As a result, the selectable icons and other interactive elements of these graphical user interface screens can be implemented as Windows widgets or the like.

It should further be appreciated that, in the previous discussion of the graphical user interfaces and screens according to this invention, selecting a selectable icon or other interactive element can include activating any feature of the graphical user interface that generates a new screen or allows the user to enter data, for example, by using a drop-down list box, a dialog box, an option button, or the like. An on-screen indicator usable to select a feature of the graphical user interface may be, for example, a mouse pointer, a cursor, or any other known or later-developed on-screen indicator used in conjunction with, for example, a mouse, a touch pad, a touch screen, a light pen, a joystick, a trackball or any other known or later-developed on-screen location input device.

It should be appreciated that the filtering and viewing system 100 shown in FIG. 7 can be implemented as a portions of a programmed general purpose computer used to control the operation of the display device 116. Alternatively, the filtering and viewing system 100 can be implemented using an ASIC, a digital signal processor (DSP), a FPGA, a PLD, a PLA, or a PAL, or using physically distinct hardware circuits, such as discrete logic elements or discrete circuit elements. The particular form the controller 120, shown in FIG. 7, will take is a design choice and will be obvious and predictable to those skilled in the art. Alternatively, the filtering and viewing system 100 can be implemented as a portion of a software program usable to form the overall control system of a computing device. In this case, each of the controller 120 and the various circuits or routines 140-170 can be implemented as software routines, objects and/or application programming interfaces or the like.

While this invention has been described in conjunction with the specific embodiments above, it is evident that many alternatives, combinations, modifications, and variations are apparent to those skilled in the art. Accordingly, the preferred embodiments of this invention, as set forth above are intended to be illustrative, and not limiting. Various changes can be made without departing from the spirit and scope of this invention.

What is claimed is:

1. A method for filtering and viewing a collaborative index of annotations of a multimedia or video stream, comprising:
   obtaining at least one multimedia or video stream;
   obtaining at least one index of annotations of the multimedia or video stream;
   associating the annotations with portions of the multimedia or video stream;
   analyzing characteristics of each of said annotations so as to assign value to each annotation according to a predefined heuristic that evaluates the analyzed characteristics;
   ranking said annotations according to the assigned value.

2. The method of claim 1, wherein obtaining the at least one multimedia or video stream comprises obtaining at least two multimedia or video streams.

3. The method of claim 2, further comprising merging at least two indexes to create a collaborative index as the obtained at least one index of annotations.

4. The method of claim 1, wherein said heuristic comprises assigning value according to the time in which each annotation was made.

5. The method of claim 1, wherein said heuristic comprises assigning value according to the person making each annotation.

6. The method of claim 1, wherein said heuristic comprises assigning value according to the proximity of each annotation to other annotations made.

7. The method of claim 6, wherein said heuristic comprises assigning value according to the length of each annotation.

8. The method of claim 1, wherein said heuristic comprises assigning value according to the frequency of appearance each annotation.

9. The method of claim 1, wherein said heuristic comprises assigning value according to the usage made by users of each annotation.

10. The method of claim 1, wherein said heuristics comprises determining a confidence score for an annotation made at a particular time.

11. The method of claim 10, wherein determining a confidence score comprises evaluating annotations made at or near the particular time.

12. The method of claim 11, wherein evaluating annotations made at or near the particular time comprises weighting the annotations made at or near the particular time.

13. The method of claim 12, wherein weighting the annotations made at or near the particular time comprises valuing the annotations based upon a proximity of each of the annotations to the particular time.

14. The method of claim 12, wherein weighting the annotations made at or near the particular time comprises valuing the annotations based upon a content of each of the annotations.

15. The method of claim 12, wherein weighting the annotations made at or near the particular time comprises valuing the annotations based upon an identity of a user who made the annotations.

16. The method of claim 15, wherein valuing the annotations based upon the identity of a user comprises determining a similarity between annotations made by the user and annotations made by at least one other user.

17. The method of claim 1, further comprising displaying the high value annotations by presenting a user interface usable to view the high value annotations.

18. The method of claim 1, further comprising clustering said annotations.

19. The method of claim 18, wherein said heuristic comprises assigning value according to the inclusion of each annotation in a cluster.

20. The method of claim 1, wherein said heuristic comprises assigning value according to similarity of each annotation to other annotations.

21. The method of claim 1, wherein said heuristic comprises assigning value to each evaluated annotation according to location of other annotations present in the same frame as the evaluated annotation.

22. The method of claim 1, wherein said heuristic comprises assigning value to each evaluated annotation according to similarity of frames of other annotations.

23. A system for filtering and viewing a collaborative index of annotations of a multimedia or video stream, comprising:
   an input device;
   a display device;
   a video or multimedia/annotation index associating circuit or routine;
   an index merging circuit or routine;
   a high value annotation determining circuit or routine analyzing characteristics of each of said annotations so as to assign value to each annotation according to a predefined heuristic that evaluates the analyzed characteristics;
   a ranking circuit or routine ranking said annotations according to the assigned value; and
   a displaying circuit or routine.

24. The system of claim 23, wherein the input device can be-used to provide at least one multimedia or video stream to a memory.

25. The system of claim 23, wherein the input device can be used to submit at least one index of annotations to a memory.

26. The system of claim 23, wherein the input device includes at least one of a laptop computer, a pen-based notebook computer, a personal digital assistant, a key tag and a wireless telephone.

27. The system of claim 23, wherein the index merging circuit or routine is usable to compile at least two indexes of annotations into a collaborative index.

28. The system of claim 23, wherein the video or multimedia/annotation index associating circuit or routine associates at least one index of annotations with at least one multimedia or video stream.

29. The system of claim 23, wherein the high value annotation determining circuit or routine determines a confidence score for an annotation made at a particular time.

30. The system of claim 29, wherein the high value annotation determining circuit or routine determines a confidence score by evaluating annotations made at or near the particular time.

31. The system of claim 30, wherein the high value annotation determining circuit or routine weights the annotations made at or near the particular time.

32. The system of claim 31, wherein the high value annotation determining circuit or routine weights the annotations based upon a proximity of each of the annotations to the particular time.

33. The system of claim 31, wherein the high value annotation determining circuit or routine weights the annotations based upon a content of each of the annotations.

34. The system of claim 31, wherein the high value annotation determining circuit or routine weights the annotations based upon an identity of a user who made the annotations.

35. The system of claim 34, wherein the high value annotation determining circuit or routine weights the annotations based upon the identity of the user by determining a similarity between annotations made by the user and annotations made by at least one other user.

36. The system of claim 23, wherein the displaying circuit or routine creates or modifies a user interface usable to display the high value annotations on the displaying device.

* * * * *